June 19, 1956　　　　J. E. JONES　　　　2,751,298
SUPERSENSITIZATION OF PHOTOGRAPHIC EMULSIONS
WITH BENZIMIDAZOLOCYANINE DYES
Filed Aug. 23, 1954

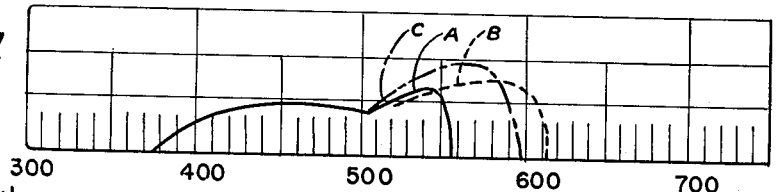

Fig. 1

A = 1'-ETHYL-3-METHYLTHIA-2'-CYANINE IODIDE
B = 5,5'-DIACETYL-1,1',3,3'-TETRAETHYLBENZIMIDAZOLOCARBOCYANINE IODIDE
C = 1'-ETHYL-3-METHYLTHIA-2'-CYANINE IODIDE PLUS 5,5'-DIACETYL-1,1',3,3'-TETRAETHYLBENZIMIDAZOLOCARBOCYANINE IODIDE

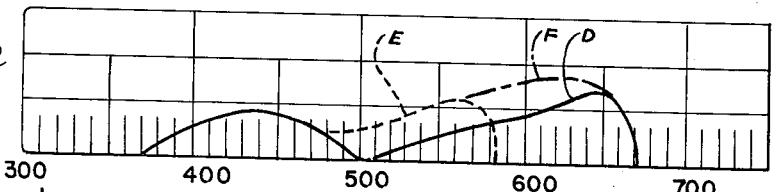

Fig. 2

D = 5,5'-DICHLORO-3,3',9-TRIETHYLTHIACARBOCYANINE BROMIDE
E = 5,5'-DI(ETHYLCARBAMYL)-1,1',3,3'-TETRAETHYLBENZIMIDAZOLOCARBOCYANINE IODIDE
F = 5,5'-DICHLORO-3,3',9-TRIETHYLTHIACARBOCYANINE BROMIDE PLUS 5,5'-DI(ETHYLCARBAMYL)-1,1',3,3'-TETRAETHYLBENZIMIDAZOLOCARBOCYANINE IODIDE

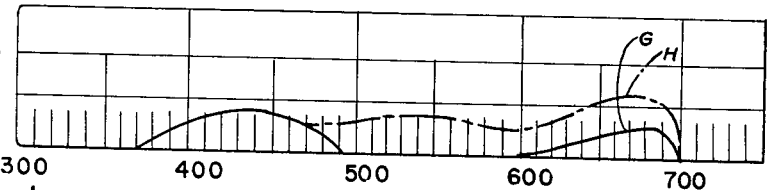

Fig. 3

G = 3,3'-DIMETHYL-9-PHENYL-4,5,4',5'-DIBENZOTHIACARBOCYANINE BROMIDE
H = 3,3'-DIMETHYL-9-PHENYL-4,5,4',5'-DIBENZOTHIACARBOCYANINE BROMIDE PLUS 5,5'-DIBROMO-1,1',3,3'-TETRAETHYLBENZIMIDAZOLOCARBOCYANINE IODIDE

Jean E. Jones
INVENTOR.

BY
ATTORNEYS 2,751,298

SUPERSENSITIZATION OF PHOTOGRAPHIC EMULSIONS WITH BENZIMIDAZOLOCY-ANINE DYES

Jean E. Jones, Rochester, N. Y., assignor to Eastman Kodak Company, Rochester, N. Y., a corporation of New Jersey Application August 23, 1954, Serial No. 451,500

16 Claims. (Cl. 95—7)

This invention relates to photographic emulsions containing cyanine dyes, and as supersensitizers therefor, certain benzimidazolocarbocyanine dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing cyanine dyes. Since the conditions in the emulsion, i. e. the hydrogen ion and/or the silver ion concentration undergo little or no change in my method, I shall designate my new method as a kind of supersensitization.

It is, therefore, an object of my invention to provide photographic emulsions containing cyanine dyes and, as supersensitizers therefor, certain benzimidazolocarbocyanine dyes. Another object is to provide a process for preparing these sensitized emulsions. Other objects will become apparent from a consideration of the following description and examples.

The cyanine dyes useful in practicing my invention can advantageously be represented by the following general formula:

I.

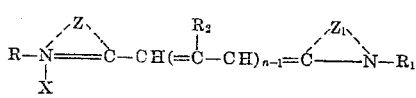

wherein R and $R_1$ each represents an alkyl group, such as methyl, ethyl, n-propyl, carbethoxymethyl, benzyl (phenylmethyl), etc., $R_2$ represents an alkyl group, such as methyl, ethyl, etc., or an aryl group, such as phenyl, o-, m-, and p-tolyl, etc. (e. g. a monocarbocyclic aromatic group of the benzene series), or a pyrryl group (e. g. pyrryl, indolyl, benzoindolyl, pyrrocolyl, etc.), $n$ represents a positive integer of from 1 to 2, X represents an acid radical, such as chloride, iodide, bromide, perchlorate, p-toluenesulfonate, benzenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g. a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5,6-dioxymethylenebenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the 2-quinoline series (e. g. 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 6-methoxy-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), etc.

The dyes of Formula I above wherein $R_2$ represents a pyrryl group and n is 2 comprise the dyes selected from those represented by the following general formula:

Ia.

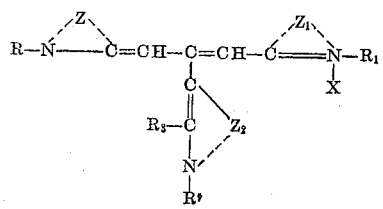

wherein R, $R_1$, Z, $Z_1$, and X each have the values given above, $R_3$ represents a hydrogen atom or an alkyl group, such as methyl, ethyl, etc., $R_4$ represents a hydrogen atom, an alkyl group, such as methyl, ethyl, n-propyl, n-amyl, n-heptyl, n-dodecyl, cyclohexyl, etc., or an aryl group, such as phenyl, o-, m-, and p-tolyl, etc., and $R_3$ and $R_4$ together represent the non-metallic atoms necessary to complete a heterocyclic nucleus of the pyridine series, and $Z_2$ represents the non-metallic atoms necessary to complete a pyrrole nucleus (includes simple pyrrole nuclei or condensed nuclei, e. g. indole).

The dyes represented by Formula I above wherein $R_2$ represents an alkyl or an aryl group and $n$ is 2 have been previously described in the prior art. See, for example, U. S. Patents 1,934,659 (dated November 7, 1933), 2,369,646 (dated February 20, 1945), 2,369,657 (dated February 20, 1945), etc. The dyes of Formula I above wherein $R_2$ represents a pyrryl group or the dyes of Formula Ia have been previously described in Heseltine et al. U. S. application Serial No. 267,928, filed January 23, 1952, now U. S. Patent 2,666,761, issued January 19, 1954.

The benzimidazolocarbocyanine dyes useful in practicing my invention can advantageously be represented by the following general formula:

II.

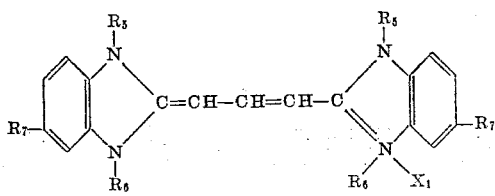

wherein $R_5$ and $R_6$ each represents an alkyl group, such as methyl, ethyl, allyl (vinylmethyl), etc., $R_7$ represents a bromine atom, an acetyl group, or an ethylcarbamyl group, and $X_1$ represents an acid radical, for example, those set forth above for X. The dyes represented by Formula II can advantageously be prepared according to the methods described in Brooker and VanLare application Serial No. 451,696 filed on even date herewith.

According to my invention, I incorporate one or more of the cyanine dyes selected from those represented by Formula I or Ia above with one or more of the dyes selected from those represented by Formula II above in a photographic emulsion. My invention is particularly directed to the ordinarily employed gelatino-silver-halide emulsions. However, my supersensitizing combinations can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the cyanine dyes selected from those represented by Formula I or Ia above, which I employ in practicing my invention, is of the order of from 0.025 to 0.30 per mol. of silver halide in the emulsion.

The carbocyanine dyes selected from those represented by Formula II above are advantageously employed in concentrations on the order of from 0.025 to 0.30 g. per mol. of silver halide in the emulsion.

Generally speaking, the ratio of concentration of the carbocyanine dye of Formula II to the cyanine dye of Formula I or Ia can vary rather widely in my combinations, e. g. from 1:20 to 1:1 (by weight) in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes of Formulas I, Ia, and II which I employ, although acetone has also been found to be satisfactory in certain cases. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to the flowable gelatino-silver-halide emulsion, the desired amounts of the stock solution of one of the dyes is slowly added, while stirring the emulsion. Stirring is continued until the dye is throoughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following examples will serve to illustrate further the manner of practicing my invention. To different portions of the same batch of photographic gelatino-silver-bromiodide emulsion were added (1) a cyanine dye selected from those of Formula I or Ia above and (2) a combination of the cyanine dye of Formula I or Ia and a carbocyanine dye selected from those represented by Formula II above. In some instances, a third coating was prepared using the same emulsion formula and adding only one of the carbocyanine dyes selected from those of Formula II. In some instances, the table will show that this third coating gave only a low speed or one too small to measure in the region transmitted by the filter (designated asterisk in the table). Different emulsions were used in some of the examples, although the emulsions of each individual example were obtained from the same batch. However, the coatings of Examples 1 to 10 were obtained from the same batch of emulsion, and the coatings of Examples 11 to 13 were obtained from the same batch of emulsion. Before coating, the emulsions containing the sensitizing dyes were digested for a short time in a tank maintained at 52° C. The different portions of emulsion were then coated on supports and exposed in the usual manner in a spectrograph and a sensitometer (Type Ib) through either a Wratten 25 filter, i. e. a filter which transmits substantially no light of wavelength shorter than 580 mu. or a Wratten 58 filter, i. e. a filter which transmits only light of wavelengths lying between 465 and 620 mu. The following are several examples of such emulsions together with the speed (red or green), gamma and fog obtained after development of the exposed emulsions in the usual manner. Example 3 shows that no supersensitization is observed when a carbocyanine dye selected from those represented by Formula I wherein $R_2$ is a hydrogen atom is employed together with a dye selected from those represented by Formula II.

bromide and curve H represents the sensitivity of the same emulsion containing 3,3'-dimethyl-9-phenyl-4,5,4'5'-dibenzothiacarbocyanine bromide and 5,5'-dibromo-

| Ex. | Dye (g. per mole of silver halide in emulsion) | Exposure ||||  Fog |
|---|---|---|---|---|---|---|
| | | Red || Green || |
| | | Speed | Gamma | Speed | Gamma | |
| 1 | (a) 5,5'-diacetyl-1,1',3,3'-tetraethylbenzimidazolocarbocyanine iodide (0.080) | | | | | .05 |
| | (b) 1'-ethyl-3-methylthia-2'-cyanine iodide (0.080) | 7.05 | 0.9 | 25.5 | 2.0 | .05 |
| | (c) dye (a) (0.030) plus dye (b) (0.080) | | | 21.0 | 2.5 | .06 |
| 2 | (d) 3,3'-dimethyl-9-ethyl-4,5,4',5'-dibenzothiacarbocyanine bromide (0.080) | 57.5 | 2.3 | 57.5 | 2.6 | .07 |
| | (e) dye (a) (0.030) plus dye (d) (0.080) | | | | | .07 |
| 3 | (f) 3,3'-diethylthiacarbocyanine iodide (0.080) | 62.5 | 2.2 | | | .06 |
| | (g) dye (a) (0.030) plus dye (f) (0.080) | 9.05 | 2.3 | 7.35 | 2.0 | .06 |
| 4 | (h) 5,5'-dibromo-1,1',3,3'-tetraethylbenzimidazolocarbocyanine iodide (0.080) | 8.45 | 2.1 | 12.5 | 2.2 | .05 |
| | (i) 9-ethyl-1',3-dimethylthia-2'-carbocyanine iodide (0.080) | | | 25.0 | 2.1 | .04 |
| | (j) dye (h) (0.030) plus dye (i) (0.080) | 11.9 | 1.5 | | | .04 |
| 5 | (k) 3,3'-dimethyl-9-phenyl-4,5,4',5'-dibenzothiacarbocyanine bromide (0.080) | 43.5 | 1.7 | | | .06 |
| | (l) dye (h) (0.030) plus dye (k) (0.080) | 9.9 | 2.4 | | | .07 |
| 6 | (m) 3,3'-dimethyl-9-ethylthiacarbocyanine bromide (0.080) | 24.0 | 2.6 | | | .06 |
| | (n) dye (h) (0.030) plus dye (m) (0.080) | 27.5 | 1.1 | | | .06 |
| 7 | (o) 5,5'-di(ethylcarbamyl)-1,1',3,3'-tetraethylbezimidazolocarbocyanine iodide (0.080) | 54.5 | 1.9 | 38.5 | 2.2 | .05 |
| | (p) 9-(2,5-dimethyl-1-phenyl-3-pyrryl)-3,3'-dimethyl-4,5,4',5'-dibenzothiacarbocyanine iodide (0.080) | 17.3 | 2.7 | | | .06 |
| | (q) dye (o) (0.030) plus dye (p) (0.080) | 21.0 | 2.9 | | | .06 |
| 8 | (r) 9-(1-ethyl-2,5-dimethyl-3-pyrryl)-3,3'-dimethyl-4,5,4',5'-dibenzothiacarbocyanine iodide (0.080) | 8.45 | 1.8 | | | .06 |
| | (s) dye (o) (0.030) plus dye (r) (0.080) | | | | | |
| 9 | (t) 5,5'-diacetoxy-3,3'-diethyl-9-methylthiacarbocyanine iodide (0.080) | 10.2 | 2.0 | | | .06 |
| | (u) dye (o) (0.030) plus dye (t) (0.080) | 6.9 | 2.3 | | | .06 |
| 10 | (v) 5,5'-dichloro-3,3',9-triethylthiacarbocyanine bromide (0.080) | 25.0 | 2.2 | | | .06 |
| | (w) dye (o) (0.080) | 70.5 | 1.46 | | | .06 |
| 11 | (x) dye (o) (0.030) plus dye (v) (0.080) | * | * | | | .04 |
| | (y) dye (h) (0.080) | 117 | 1.72 | | | .07 |
| | (z) dye (v) (0.080) plus dye (h) (0.030) | * | * | | | .04 |
| 12 | (a') dye (a) (0.080) | 117 | 0.93 | | | .06 |
| | (b') dye (a) (0.030) plus dye (v) (0.080) | 6.7 | 0.66 | | | .04 |
| | | 117 | 1.6 | | | .06 |

The accompanying drawing illustrates the supersensitizing effect obtained with three of my new combinations of dyes in gelatino-silver-bromiodide emulsions. Each figure of the drawing is a diagrammatic reproduction of three, or in the case of Figure 3, two spectrographs. In each figure, the sensitivity of the emulsion containing the cyanine dye of Formula I or Ia is represented by the solid lower curve. The sensitivity of the emulsion containing the carbocyanine dye of Formula II is represented by the curve composed of dotted lines, while the sensitivity of the emulsion containing both a cyanine dye of Formula I or Ia and a carbocyanine dye of Formula II is represented by the curve composed of alternating long and short lines. In Figure 3, the curve showing the sensitivity conferred on the emulsion by the carbocyanine dye of Formula II alone has been emitted as it is identical with that of curve B in Figure 1.

In Figure 1, curve A represents the sensitivity of an ordinary gelatino-silver-bromiodide emulsion sensitized with 1'-ethyl-3-methylthia-2'-cyanine iodide, curve B represents the sensitivity of the same emulsion containing 5,5'-diacetyl-1,1',3,3'-tetraethylbenzimidazolocarbocyanine iodide, and curve C represents the sensitivity of the same emulsion containing 1'-ethyl-3-methylthia-2'-cyanine iodide and 5,5'-diacetyl-1,1',3,3'-tetraethylbenzimidazolocarbocyanine iodide. The sensitometric measurements for these emulsions are given in Example 1 of the above table.

In Figure 2, curve D represents the sensitivity of an ordinary gelatino-silver-bromiodide emulsion containing 5,5'-dichloro-3,3',9-triethylthiacarbocyanine bromide, curve E represents the sensitivity of the same emulsion containing 5,5'-di(ethylcarbamyl)-1,1',3,3'-tetraethylbenzimidazolocarbocyanine iodide, and curve F represents the sensitivity of the same emulsion containing 5,5'-dichloro-3,3',9-triethylthiacarbocyanine bromide and 5,5'-di(ethylcarbamyl)-1,1',3,3'-tetraethylbenzimidazolocarbocyanine iodide. The sensitometric measurements for these emulsions are given in Example 11 of the above table.

In Figure 3, curve G represents the sensitivity of an ordinary gelatino-silver-bromiodide emulsion containing 3,3'-dimethyl-9-phenyl-4,5,4',5'-dibenzothiacarbocyanine bromide and 1,1',3,3'-tetraethylbenzimidazolocarbocyanine iodide. The sensitometric measurements for these emulsions are given in Example 5 in the above table.

My invention is primarily directed to the ordinarily employed gelatino-silver-halide developing-out emulsions, e. g. gelatino-silver-chloride, -chlorobromide, -chloroiodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with my invention can be coated in the usual manner on any suitable support, e. g. glass, cellulose nitrate film, cellulose acetate film, polyvinylacetal resin film, paper or metal.

Photographic silver halide emulsions such as those listed above, containing the supersensitizing combinations of my invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application 771,380, filed August 29, 1947, now U. S. Patent 2,640,776, issued June 2, 1953, etc.; or mixtures of such addenda. Dispersing agents for color couplers, such as those set forth in U. S. Patents 2,322,027 and 2,304,940, can also be employed in the above-described emulsions.

In the above table it will be noted that in certain examples the amounts of dyes used in the supersensitizing combinations do not correspond to the amounts used with each dye alone. Actually, supersensitization occurs according to my invention when the combination of dyes gives more speed than either dye alone at any concentration. Thus, in some instances, the amount of dye, when used alone, is not identical with that used in the supersensitizing combination. This is due to the fact that optimum conditions have been used, insofar as possible, in each of the coatings. Use of larger amounts of dyes in the supersensitizing combinations is not necessary, and in some instances, is actually detrimental.

What I claim as my invention and desire secured by Letters Patent of the United States is:

1. A photographic silver halide emulsion sensitized with a supersensitizing combination of at least one cyanine dye selected from those represented by the following general formula:

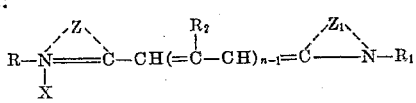

wherein R and $R_1$ each represents an alkyl group, $R_2$ represents a member selected from the group consisting of an alkyl group, an aryl group, and a pyrryl group, $n$ represents a positive integer or from 1 to 2, X represents an acid radical, and Z and $Z_1$ each represents the non-metallic atoms necessary to complete a heterocyclic nucleus containing from 5 to 6 atoms in the heterocyclic ring, and at least one carbocyanine dye selected from those represented by the following general formula:

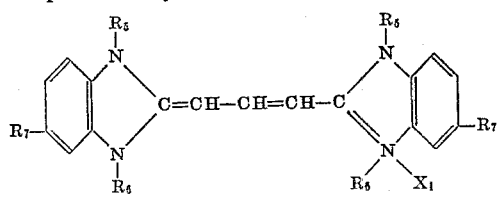

wherein $R_5$ and $R_6$ each represents an alkyl group, $R_7$ represents a member selected from the group consisting of an acetyl group and an ethylcarbamyl group, and $X_1$ represents an acid radical.

2. A photographic silver halide emulsion sensitized with a supersensitizing combination of at least one cyanine dye selected from those represented by the following general formula:

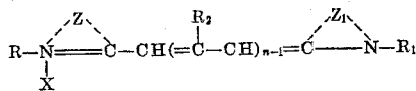

wherein R and $R_1$ each represents an alkyl group, $R_2$ represents a member selected from the group consisting of an alkyl group, an aryl group, and a pyrryl group, $n$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the 2-quinoline series, and at least one carbocyanine dye selected from those represented by the following general formula:

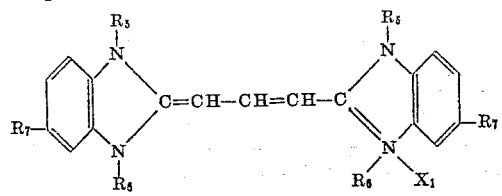

wherein $R_5$ and $R_6$ each represents an alkyl group, $R_7$ represents a member selected from the group consisting of an acetyl group and an ethylcarbamyl group, and $X_1$ represents an acid radical.

3. A photographic silver halide emulsion as defined in claim 2 wherein the vehicle for the silver halide is gelatin.

4. A photographic gelatino-silver-halide developing-out emulsion sensitized with a supersensitizing combination of at least one cyanine dye selected from those represented by the following general formula:

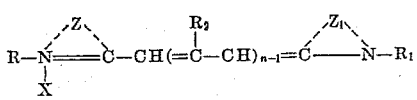

wherein R and $R_1$ each represents an alkyl group containing from 1 to 2 carbon atoms, $R_2$ represents a member selected from the group consisting of a methyl group, an ethyl group, and a phenyl group, $n$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the 2-quinoline series, and at least one carbocyanine dye selected from those represented by the following general formula:

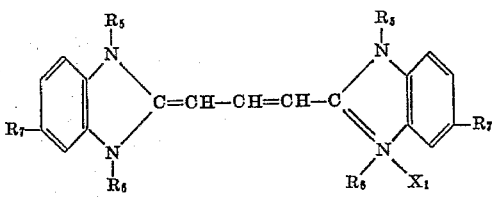

wherein $R_5$ and $R_6$ each represents a member selected from the group consisting of a methyl group, an ethyl group, and in allyl group, $R_7$ represents a member selected from the group consisting of an acetyl group and an ethylcarbamyl group, and $X_1$ represents an acid radical.

5. A photographic gelatino-silver-halide developing-out emulsion as defined in claim 4 wherein the silver halide is silver-bromiodide.

6. A photographic gelatino-silver-halide developing-out emulsion sensitized with a supersensitizing combination of at least one carbocyanine dye selected from those represented by the following general formula:

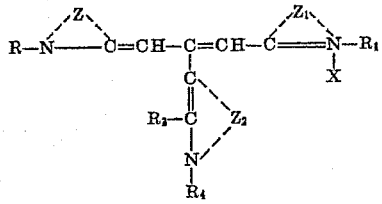

wherein R and $R_1$ each represents a member selected from the group consisting of a methyl group and an ethyl group, $R_3$ and $R_4$ each represents a member selected from the group consisting of a hydrogen atom, a methyl group, an ethyl group, and a phenyl group, and $R_3$ and $R_4$ together represent the non-metallic atoms necessary to complete a heterocyclic nucleus of the pyridine series, X represents an acid radical, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the 2-quinoline series, and $Z_2$ represents the non-metallic atoms necessary to complete a heterocyclic nucleus of the pyrrole series, and at least one carbocyanine dye selected from those represented by the following general formula:

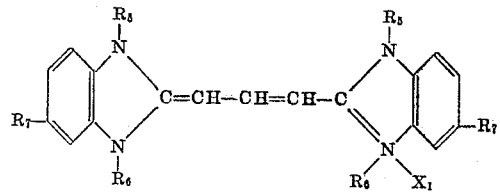

wherein $R_5$ and $R_6$ each represents a member selected from the group consisting of a methyl group, an ethyl group, and an allyl group, $R_7$ represents a member selected from the group consisting of an acetyl group and an ethylcarbamyl group, and $X_1$ represents an acid radical.

7. A photographic gelatino-silver-halide developing-out emulsion as defined in claim 6 wherein the silver halide is silver-bromiodide.

8. A photographic gelatino-silver-halide developing-out emulsion sensitized with a supersensitizing combination of at least one simple cyanine dye selected from those represented by the following general formula:

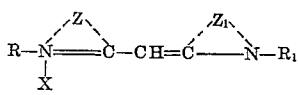

wherein R and $R_1$ each represents a member selected from the group consisting of a methyl group and an ethyl group, X represents an acid radical, Z represents the non-metallic atoms necessary to complete a heterocyclic nucleus of benzothiazole series, $Z_1$ represents in the non-metallic atoms necessary to complete a heterocyclic nucleus of the 2-quinoline series, and at least one carbocyanine dye selected from those represented by the following general formula:

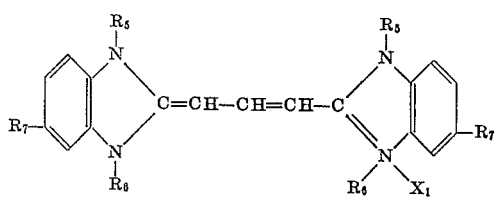

wherein $R_5$ and $R_6$ each represents a member selected from the group consisting of a methyl group, an ethyl group, and an allyl group, $R_7$ represents a member selected from the group consisting of an acetyl group and an ethylcarbamyl group, and $X_1$ represents an acid radical.

9. A photographic gelatino-silver-halide developing-out emulsion sensitized with a supersensitizing combination of at least one carbocyanine dye selected from those represented by the following general formula:

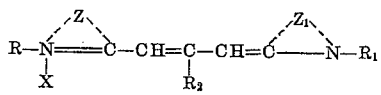

wherein R, $R_1$ and $R_2$ each represents a member selected from the group consisting of a methyl group and an ethyl group, X represents an acid radical, and Z and $Z_1$ each represents the non-metallic atoms necessary to complete a heterocyclic nucleus of the benzothiazole series, and at least one carbocyanine dye selected from those represented by the following general formula:

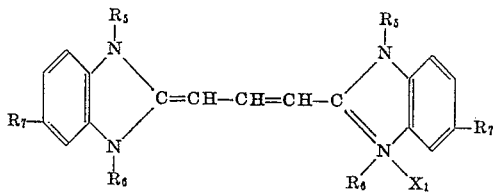

wherein $R_5$ and $R_6$ each represents a member selected from the group consisting of a methyl group, and ethyl group, and an allyl group, $R_7$ represents a member selected from the group consisting of an acetyl group and an ethylcarbamyl group, and $X_1$ represents an acid radical.

10. A photographic gelatino-silver-halide developing-out emulsion sensitized with a supersensitizing combination of at least one carbocyanine dye selected from those represented by the following general formula:

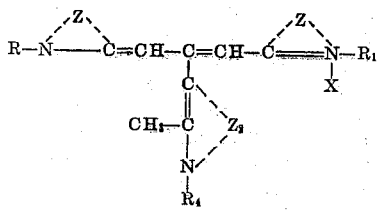

wherein R and $R_1$ each represents a member selected from the group consisting of a methyl group and an ethyl group, $R_4$ represents a member selected from the group consisting of a hydrogen atom, a methyl group, an ethyl group, and a phenyl group, X represents an acid radical, Z represents the non-metallic atoms necessary to complete a heterocyclic nucleus of the naphthothiazole series, and $Z_2$ represents the non-metallic atoms necessary to complete a heterocyclic nucleus of the pyrrole series, and at least one carbocyanine dye selected from those represented by the following general formula:

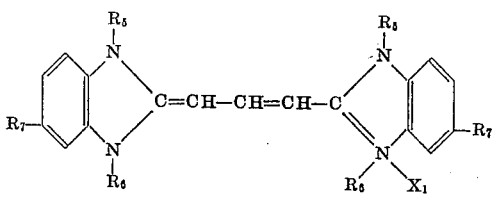

wherein $R_5$ and $R_6$ each represents a member selected from the group consisting of a methyl group, an ethyl group, and an allyl group, $R_7$ represents a member selected from the group consisting of an acetyl group and an ethylcarbamyl group, and $X_1$ represents an acid radical.

11. A photographic gelatino-silver-halide developing-out emulsion sensitized with a supersensitizing combination of 1'-ethyl-3-methylthia-2'-cyanine iodide and 5,5'-diacetyl - 1,1',3,3' - tetraethylbenzimidazolocarbocyanine iodide.

12. A photographic gelatino-silver-halide developing-out emulsion sensitized with a supersensitizing combination of 5,5'-diacetoxy-3,3'-diethyl-9-methylthiacarbocyanine iodide and 5,5'-di(ethylcarbamyl)-1,1',3,3'-tetraethylbenzimidazolocarbocyanine iodide.

13. A photographic gelatino-silver-halide developing-out emulsion sensitized with a supersensitizing combination of 5,5' - dichloro - 3,3'-9 - triethylthiacarbocyanine bromide and 5,5'-di(ethylcarbamyl)-1,1'-3,3'-tetraethylbenzimidazolocarbocyanine iodide.

14. A photographic gelatino-silver-halide developing-out emulsion sensitized with a supersensitizing combination of 9(2,5-dimethyl-1-phenyl-3-pyrryl)-3,3'-dimethyl-4,5,4',5'-dibenzothiacarbocyanine iodide and 5,5'-di(ethylcarbamyl) - 1,1',3,3' - tetraethylbenzimidazolo - carbocyanine iodide.

15. A photographic gelatino-silver-halide developing-out emulsion sensitized with a supersensitizing combination of 5,5'-dichloro-3,3',9-triethylthiacarbocyanine bromide and 5,5' - diacetyl - 1,1',3,3' - tetraethylbenzimidazolocarbocyanine iodide.

16. A photographic gelatino-silver-bromiodide developing-out emulsion sensitized with a supersensitizing combination of at least one cyanine dye selected from those represented by the following general formula:

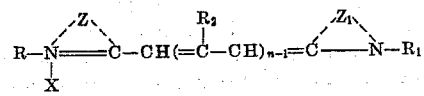

wherein R and $R_1$ each represents a member selected from the group consisting of a methyl group and an ethyl group, $R_2$ represents a member selected from the group consisting of a methyl group, an ethyl group, and a phenyl group, $n$ represents a positive integer of from 1 to 2, X represents an acid radical, and Z and $Z_1$ each represents the non-metallic atoms necessary to complete a heterocyclic nucleus selected from the group consisting of those of the benzothiazole series, those of the naphthothiazole series, and those of the 2-quinoline series, and at least one carbocyanine dye selected from those represented by the following general formula:

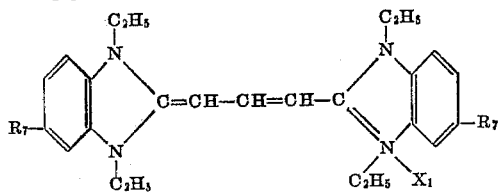

wherein $R_7$ represents a member selected from the group consisting of an acetyl group and an ethylcarbamyl group, and $X_1$ represents an acid radical.

References Cited in the file of this patent
UNITED STATES PATENTS

| | | |
|---|---|---|
| 2,688,545 | Carroll et al. | Sept. 7, 1954 |
| 2,701,198 | Carroll et al. | Feb. 1, 1955 |